(12) United States Patent
Aldinger et al.

(10) Patent No.: US 8,614,709 B2
(45) Date of Patent: Dec. 24, 2013

(54) PROGRAMMABLE EFFECTS FOR A USER INTERFACE

(75) Inventors: Robert Aldinger, Seattle, WA (US); Fabian Toader, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 12/268,859

(22) Filed: Nov. 11, 2008

(65) Prior Publication Data

US 2010/0122191 A1    May 13, 2010

(51) Int. Cl.
*G06F 3/048* (2013.01)

(52) U.S. Cl.
USPC ........... 345/426; 345/506; 345/522; 715/744; 715/762; 715/765; 715/825; 715/864

(58) Field of Classification Search
USPC .......... 345/426, 506, 522; 715/744, 762, 765, 715/825, 864
See application file for complete search history.

(56) References Cited

U.S. PATENT DOCUMENTS

| | | | |
|---|---|---|---|
| 5,793,374 A | | 8/1998 | Guenter et al. |
| 7,015,909 B1 | | 3/2006 | Morgan, III et al. |
| 7,176,917 B1 | | 2/2007 | Morgan et al. |
| 7,750,913 B1 | * | 7/2010 | Parenteau et al. ............. 345/502 |
| 7,840,901 B2 | * | 11/2010 | Lacey et al. .................... 715/738 |
| 8,154,554 B1 | * | 4/2012 | Brown et al. .................. 345/522 |
| 2004/0169671 A1 | | 9/2004 | Aronson et al. |
| 2006/0026529 A1 | * | 2/2006 | Paulsen et al. ................ 715/776 |
| 2007/0018980 A1 | | 1/2007 | Berteig et al. |
| 2007/0291038 A1 | * | 12/2007 | Herz et al. ..................... 345/501 |
| 2008/0001956 A1 | | 1/2008 | Markovic et al. |
| 2008/0005731 A1 | | 1/2008 | Markovic et al. |

OTHER PUBLICATIONS

"Unreal Technology", Retrieved on Sep. 3, 2008, Webpage available at :-http://www.unrealtechnology.com/features.php?ref=rendering.
Lastra, et al., "Real-Time Programmable Shading", Proceedings of the 1995 Symposium on Interactive 3D Graphics, Year of Publication: 1995, pp. 1-8.
Liu, Feng, "Platform Independent Real-Time X3d Shaders and Their Applications in Bioinformatics Visualization", A Dissertation Submitted in Partial Fulfillment of the Requirements for the Degree of Doctor of Philosophy in the College of Arts and Sciences, Georgia State University, Dated: 2005, 209 Pages.
Tatarchuk, Natasha, "Beginner Shader Programming with RenderMonkey", Game Developer Conference, Dated: 2003, 45 Pages.
"Using Shaders in Direct3D 9", Retrieved on Sep. 3, 2008, Webpage available at :-http://msdn.microsoft.com/en-us/library/bb509704(VS.85).aspx#Rendering_a_Programmable_Shader.

* cited by examiner

*Primary Examiner* — Xiao M. Wu
*Assistant Examiner* — Todd Buttram
(74) *Attorney, Agent, or Firm* — Alleman Hall McCoy Russell & Tuttle LLP

(57) ABSTRACT

A programmable effects system for graphical user interfaces is disclosed. One embodiment comprises receiving one or more effect elements to apply to an element in a graphical user interface for a device, ordering the effect elements in a pipeline of operations, and storing the pipeline of operations in an effect template. Then, after the graphics hardware capability for a device is determined, the effect template may be used to create a shader that includes supported effects to render an element in the graphical user interface.

18 Claims, 3 Drawing Sheets

PROGRAMMABLE EFFECTS FOR A USER INTERFACE

BACKGROUND

Graphical user interface (GUI) platforms are deployed on multiple devices with different graphics hardware capabilities. Modern graphics processors are capable of high-fidelity visual effects for some classes of applications, e.g. video games, but GUI platforms have not utilized these hardware capabilities.

Some GUI platforms, such as Microsoft's Windows Presentation Format (WPF), use hardware acceleration to provide a rich GUI experience. However, these platforms use hardware acceleration in a least common denominator approach and do not utilize the range of hardware capabilities. Additionally, these platforms do not allow GUI developers to build custom graphical effects, nor do these GUI platforms provide a fallback mechanism for techniques targeted at high-end classes of hardware that are implemented on a device that does not support high-fidelity visual effects.

SUMMARY

Accordingly, various embodiments to provide programmable effects for a user interface are described below in the Detailed Description. For example, one embodiment comprises receiving one or more effects to apply to an element in a graphical user interface for a device, ordering the effects in a pipeline of operations, and storing the pipeline of operations in an effect template. In this way, after the graphics hardware capability for a device is determined the effect template may be used to create a shader that includes graphics hardware supported effects to adjust an element in a graphical user interface.

Another example embodiment comprises receiving an effect template including a plurality of effects that are ordered in a pipeline of operations, determining graphics hardware capability for a device, creating a shader including effects in the pipeline of operations that are supported by the graphics hardware to adjust the element in the graphical user interface, and adjusting the element in the graphical user interface.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
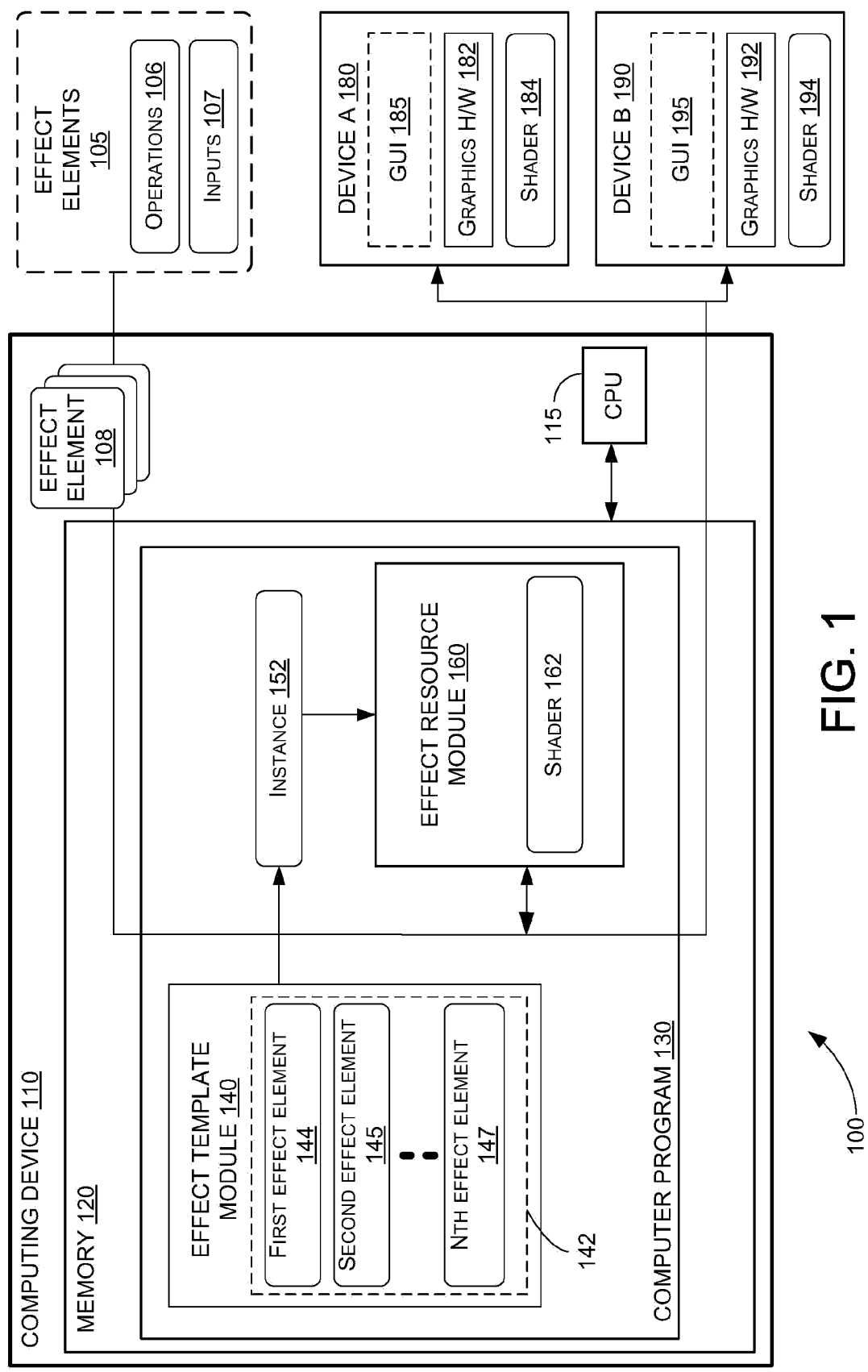
FIG. 1 shows an example of an embodiment environment for generating scalable graphics for a graphical user interface.

FIG. 1 shows an example of an environment 100 including a computing device 110 that creates scalable graphics for a graphical user interface (GUI). For example, one embodiment system provides a library of base elements as building blocks to create graphic effects in a GUI. Computing device 110 includes a memory 120, a computer program 130 stored in memory, an input, and a processor 115 in communication with the input and the memory to provide user defined visual effects for a GUI that may be scaled to graphics hardware capabilities for a range of devices. Computing device 110 receives one or more effect elements 108, and orders the effect elements into a pipeline of operations in an effect template 142.

In the illustrated example, the pipeline of operations includes a first effect element 144, second effect element 145, up through an Nth effect element 147. These effect elements may include operations 106, inputs 107, etc. Next, one or more shaders may be created that incorporate the effect elements in the pipeline of operations according to the graphics hardware capabilities of a target device. Further, these elements may be combined in an arbitrary manner by a GUI author to provide a rich user interface experience according to supported operations for graphics hardware or other graphics sub-system of a target device.

In an example including multiple devices comprising different graphics hardware capabilities, a GUI author may create a pipeline of operations that is supported on one device 180 with graphics hardware 182 in a different manner than it is supported on another device 190 having graphics hardware 192. For example, a GUI may be designed with 2.0 minimum-bar graphics capabilities in mind but this may be supported by graphics hardware 182 and not graphics hardware 192, therefore shader 184 may be created with the 2.0 minimum-bar support for device 180, while shader 194 may be created for device 190 without 2.0 minimum-bar support.

Effect elements in the pipeline of operations may be implemented in a shader on an effect-by-effect basis. For example, a GUI developer may create a scalable GUI comprising graphics effects that are not supported by current hardware, while still allowing a range of fallback graphic effects that provide more than a minimum-bar experience where supported, as a non-limiting example. Additionally, scalable elements for graphical user interfaces may be created for target devices based on hardware or software capabilities other than graphics hardware capabilities.

Referring to the embodiment in FIG. 1 in detail, computing device 110 includes an effect template module 140 configured to receive a plurality of effect elements 105 to apply to an element in a GUI 185 for a device 180. The effect template module may be further configured to order the plurality of effects into a pipeline of operations. In this way, the effect template module may define an effect template 142 that includes the ordered effect elements 105.

Effects may include inputs 107, operations 106, etc. that adjust a property of a visual element or create a visual element in a graphical user interface. Example effects include inputs such as colors, images, light sources, and blending elements, and operations such as desaturate, blur, tint, inverse alpha elements, filters, etc. Some embodiments may receive previously combined effects, user-developed graphics effects, etc.

In some embodiments, the effect template 142 includes a fallback effect to be set as a minimum-bar implementation for effects supported by the graphics hardware. In this way, each effect template may have a different minimum-bar implementation to incorporate fallback effects that scale to different graphics hardware capabilities.

Computing device 110 includes an effect resource module 160 in communication with the effect template module 140. The effect resource module creates a shader 162 that may be used to adjust an element in GUI 185 in device 180. In this way, the shader 162 uses the effect elements 105 in the pipeline of operations that are supported by graphics hardware 182 in the device 180.

Computing device 110 is configured to create an instance 152 of the effect template 142 that links to the shader 162 to adjust an element in a graphical user interface, such as GUI 185. As an example, an effects template may use a markup language to define user specified graphics elements and therefore create a pipeline of operations including inputs, i.e. color, and operations, filters, etc.

In another example, an application programming interface may link to an effect resource to define user specified graphics elements and therefore create a pipeline of operations. In either approach, the specified graphics elements may be processed based on graphics hardware capabilities and then converted into a graphics hardware shader to execute the pipeline of operations on a graphics processing unit (GPU). If an effect is not supported, a fallback effect may be used that is supported by the graphics hardware.

In some embodiments, element structures in an effects template may define a set of properties that may be animated or changed when an effect is in use. For example, these properties may map to shader variables stored on a GPU and an embodiment system then manages the mapping of markup properties to shader variables. After a shader is compiled, it may be cached and shared across multiple GUI elements that refer to it.

In one example, multiple graphical user interface authors may be working on a large application and may not know of an existing compiled shader, effects templates, etc. For example, the multiple authors may have multiple templates that result in the same compiled shader. Therefore, some embodiments so may use a specific element structure to develop a cache key. In this way, the cache key may then be implemented in a low-level renderer, or other graphics engine, and when a new effects template is generated the embodiment can do a look-up for the cache key and load an already generated shader as opposed to compiling a new shader. Conventional applications either pre-compile all requested shaders at startup, or they recompile a shader every time an effect is requested.

In some embodiments, a template/instance approach may be used to expose graphics effects in computationally inexpensive instances while corresponding templates bear the majority of the computational cost. Additionally, markup element structures provide an abstraction layer to allow an effects template to run on multiple hardware platforms with varied underlying graphics systems.

In some embodiments, the template/instance approach provides a many-to-one mapping allowing multiple effects templates to map to one effect resource, as described in the caching example above. Additionally, instances may have a many-to-one for effects templates.

Furthermore, the embodiments described herein allow combination of effects in a user specified order, control of effects in a non-binary fashion where each effect may have an adjustable property and not be implemented in an on or off manner. In this way, if the order of effects is important, the effects template allows a GUI author to nest effects, control when effects get combined, control what happens in a specified order, etc. For example, at a markup level the effects template may provide a blur element may include a number of properties that may be adjusted, such as the result of the blur may be desaturated, or a complex blend modes may be combined with the blur element, instead of a binary blur element that is either on or off.

Figure 2:
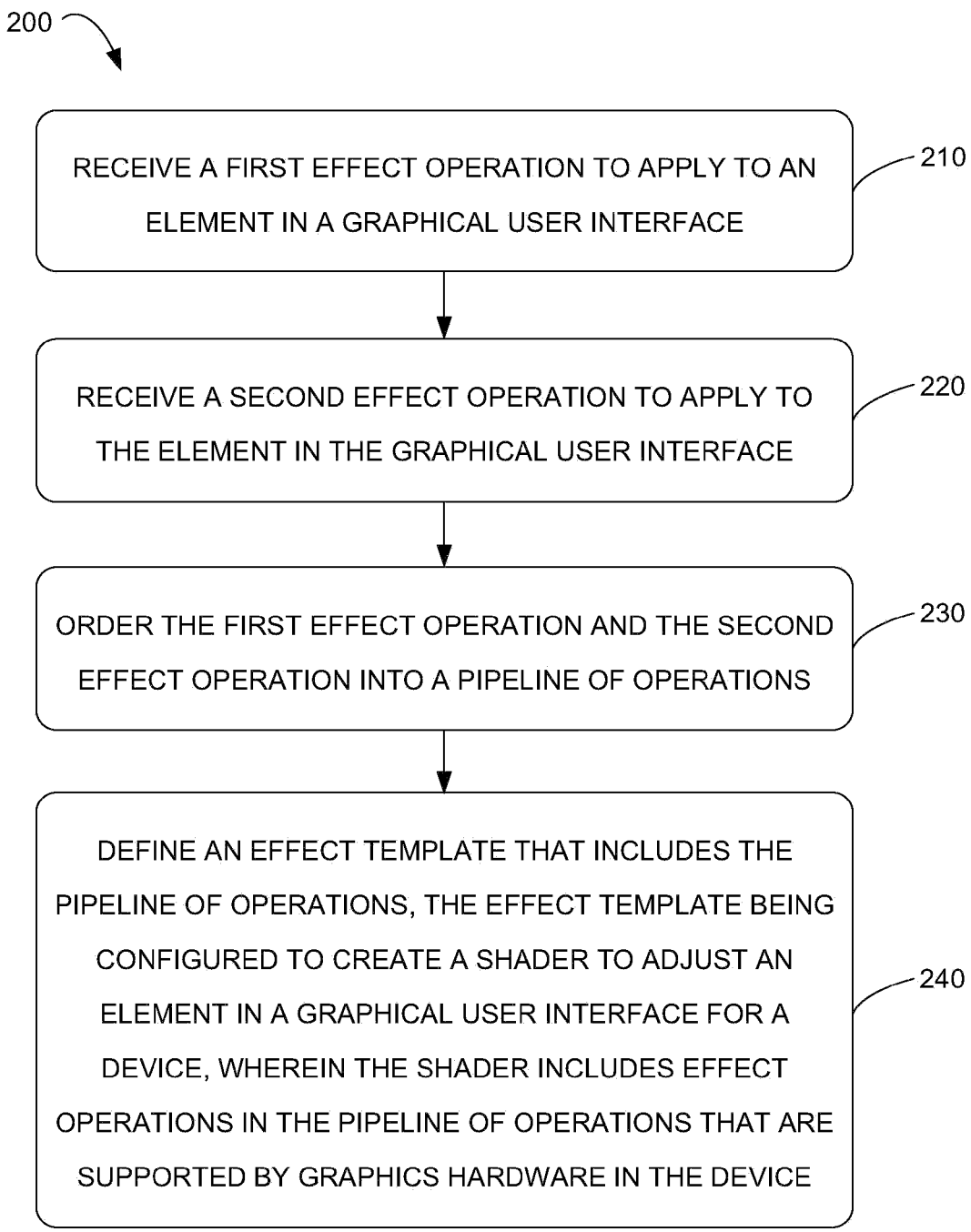
FIG. 2 shows a process flow depicting an embodiment of a method for generating scalable graphics in a graphical user interface.

FIG. 2 shows a process flow depicting an embodiment of a method 200 for generating scalable graphics in a graphical user interface. Method 200 may be used to generate a GUI that when deployed on a device is executable to scale the graphics of the GUI according to the device hardware. As indicated in block 210, method 200 comprises receiving a first effect operation to apply to an element in a graphical user interface.

In some embodiments, an effect operation may be an input or an operation for an element in a graphical user interface. Additionally, the input or operation may include a property that can be adjusted to change a shader at runtime. Example effect operations include inputs such as colors, images, light sources, and blending elements, and operations such as desaturate, blur, tint, inverse alpha elements, filters, etc. Some embodiments may receive previously combined effects, user-developed graphics effects, etc.

Method 200 also comprises receiving a second effect operation to apply to the element in the graphical user interface, as indicated in block 220. Next, method 200 comprises ordering the first effect operation and the second effect operation into a pipeline of operations, as indicated at 230. In some embodiments, a single effect operation may be used with fallback positions, while in other embodiments a plurality of effects may be used and ordered in the pipeline according to developer preference, ordered arbitrarily, etc.

In block 240, method 200 comprises defining an effect template that includes the pipeline of operations, the effect template being configured to create a shader to adjust an element in a graphical user interface for a device, wherein the shader includes effect operations in the pipeline of operations that are supported by graphics hardware in the device.

For example, graphics hardware capability may be associated with a device driver, firmware number, accessed from a database or online, user specified, queried, etc. In one example, the effect template may comprise markup language that links to an effect resource, and the effect resource may be configured to create the shader including effects supported by graphics hardware in the device.

In some embodiments, the shader may be created with a fallback effect for an effect not supported by the graphics hardware. Additionally, the shader may be dynamically created at runtime to provide a rich user interface experience by using the shader to provide an element in a graphical user interface. In some embodiments, method 200 may include caching the shader for a first effect template and providing the shader for a second effect template.

Figure 3:
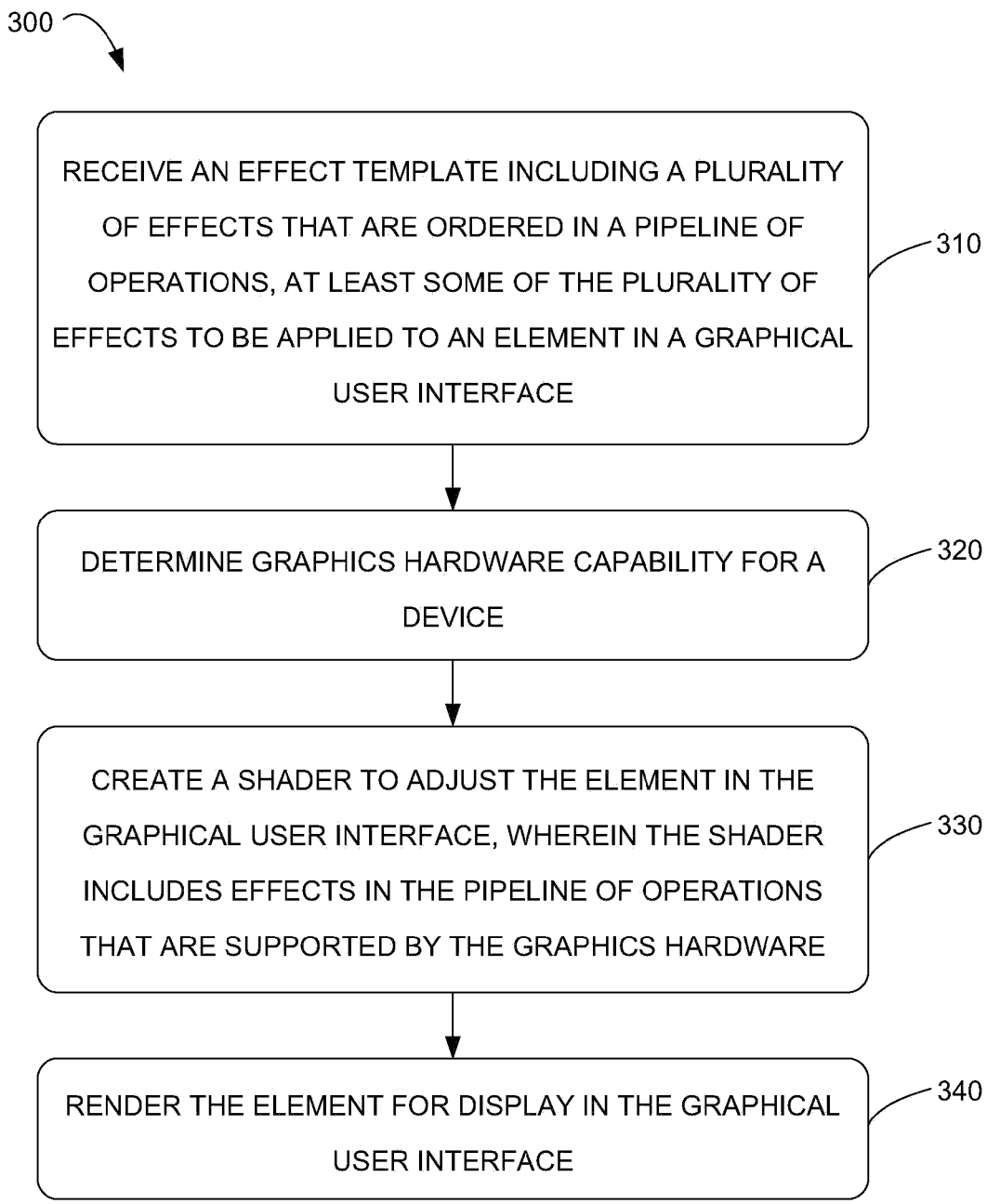
FIG. 3 shows a process flow depicting an embodiment of a method for creating a graphical user interface.

FIG. 3 shows a process flow depicting an embodiment of a method 300 for creating a graphical user interface. First, as indicated in block 310, method 300 comprises receiving an effect template including a plurality of effects that are ordered in a pipeline of operations, at least some of the plurality of effects to be applied to an element in a graphical user interface. In some embodiments, the effect template comprises markup language that links to an effect resource, and the effect resource creates the shader using effects supported by graphics hardware in the device.

In some embodiments, an effect may be an input or an operation for an element in a graphical user interface. Additionally, the input or operation may include an adjustable property for adjusting the shader at runtime. Example effects include inputs such as colors, images, light sources, and blending elements, and operations such as desaturate, blur, tint, inverse alpha elements, filters, etc. Some embodiments may receive previously combined effects, user-developed graphics effects, etc.

Method 300 also comprises determining graphics hardware capability for a device, as indicated in block 320. For example, graphics hardware capability may be associated with a device driver, firmware number, accessed from a database or online, user specified, queried, etc.

Next, method 300 comprises creating a shader to adjust the element in the graphical user interface, wherein the shader includes effects in the pipeline of operations that are supported by the graphics hardware, as indicated at 330. In some embodiments, the shader may be created with a fallback effect for an effect not supported by the graphics hardware. Additionally, the shader may be dynamically created at runtime.

In block 340, method 300 comprises rendering the element for display in the graphical user interface according to the graphics hardware capabilities and the effects implemented in the shader. In some embodiments, method 300 may include caching a shader for a first effect template and providing the shader for a second effect template.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to personal computers, servers, laptop computers, hand-held devices, cellular phones, microprocessor-based programmable consumer electronics and/or appliances, and other suitable computer devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for generating scalable graphics for a graphical user interface, the method comprising:
   receiving a first effect to apply to an element in a graphical user interface;
   receiving a second effect to apply to the element in the graphical user interface;
   ordering the first effect and the second effect into a pipeline of operations; and
   defining a markup language effect template that includes the pipeline of operations in a markup language and links to an effect resource, the effect resource being linked to a plurality of different markup language effect templates;
   determining graphics hardware capabilities of a first graphics processing unit;
   determining graphics hardware capabilities of a second graphics processing unit different than the first graphics processing unit;
   after determining graphics hardware capabilities of the first graphics processing unit, creating from the markup language effect template with the effect resource a first shader in accordance with the graphics hardware capabilities of the first graphics processing unit, the first shader to adjust an element in a graphical user interface for the first graphics processing unit;
   after determining graphics hardware capabilities of the second graphics processing unit, creating from the markup language effect template with the effect resource a second shader in accordance with the graphics hardware capabilities of the second graphics processing unit, the second shader to adjust an element in a graphical user interface of the second graphics processing unit, wherein the second shader is configured to implement one or more effects that are supported by the second graphics processing unit but not by the first graphics processing unit, and wherein the first shader is not configured to implement the one or more effects.

2. The method of claim 1, wherein the markup language effect template is configured to create the first shader with a fallback effect for an effect not supported by the graphics hardware in the first graphics processing unit.

3. The method of claim 1, wherein the markup language effect template is a first markup language effect template, the method further comprising:
   caching the first shader; and
   providing the first shader for a second markup language effect template.

4. The method of claim 1, wherein an effect is an input or an operation for the element in the graphical user interface.

5. The method of claim 4, wherein the input and the operation include an adjustable property that can be adjusted in the second shader at runtime.

6. The method of claim 4, wherein the input is a color and the operation is a filter.

7. The method of claim 1, wherein the second shader is dynamically created at runtime.

8. The method of claim 1, further comprising using the second shader to provide the element in the graphical user interface of the second graphics processing unit.

9. A method for creating a graphical user interface, the method comprising:
   receiving a markup language effect template including a plurality of effects that are ordered in a pipeline of operations, at least some of the plurality of effects to be applied to an element in a graphical user interface, the markup language effect template linking to an effect resource that is linked to a plurality of different markup language effect templates;
   determining graphics hardware capability for a graphics processing unit;
   after determining the graphics hardware capability for the graphics processing unit, using the effect resource to create a shader in accordance with the markup language effect template, the shader to adjust the element in the graphical user interface, wherein the shader includes effects in the pipeline of operations that are supported by the graphics processing unit; and using the shader to render the element in the graphical user interface.

10. The method of claim 9, wherein the shader is created with a fallback effect for an effect not supported by the graphics processing unit.

11. The method of claim 9, wherein the markup language effect template is a first markup language effect template, the method further comprising:
   caching the shader; and
   providing the shader for a second markup language effect template.

12. The method of claim 9, wherein an effect is an input or an operation for the element in the graphical user interface.

13. The method of claim 12, wherein the input or the operation includes an adjustable property that can be adjusted in the shader at runtime.

14. The method of claim 12, wherein the input is a color and the operation is a filter.

15. The method of claim 9, wherein the shader is dynamically created at runtime.

16. A system for generating scalable graphics in a graphical user interface, the system comprising:
   a memory; and
   a processor in communication with the memory, the processor and the memory cooperating to execute an effect template module and an effect resource module;
   the effect template module configured to receive a plurality of effects to apply to an element in a graphical user interface, the effect template module being further configured to order the plurality of effects in a pipeline of operations and to define a markup language effect template that includes the pipeline of operations in a markup language and links to an effect resource that is linked to a plurality of different markup language effect templates; and
   the effect resource module being in communication with the effect template module and being configured to create a shader to adjust the element in the graphical user interface, wherein the shader is created to include effects in the pipeline of operations that are supported by graphics hardware in a graphics processing unit; the effect template module and the effect resource module being configured to create an instance of the markup language effect template that links to the shader to adjust the element in the graphical user interface.

17. The system of claim 16, wherein the effect template module uses an application programming interface to access the markup language effect template and the instance.

18. The system of claim 16, wherein the markup language effect template includes a fallback effect to be used if an effect is not supported by the graphics hardware.

* * * * *